United States Patent [19]

Engen et al.

[11] Patent Number: 5,551,961

[45] Date of Patent: Sep. 3, 1996

[54] ABRASIVE ARTICLES AND METHODS OF MAKING SAME

[75] Inventors: Robbyn L. Engen, River Falls, Wis.; Douglas S. Spencer, St. Paul; Jeffrey E. Ford, Woodbury, both of Minn.

[73] Assignee: Minnesota Mining and Manufacturing Company, St. Paul, Minn.

[21] Appl. No.: 479,318

[22] Filed: Jun. 7, 1995

Related U.S. Application Data

[63] Continuation-in-part of Ser. No. 308,656, Sep. 19, 1994, which is a continuation-in-part of Ser. No. 300,854, Sep. 6, 1994, Pat. No. 5,486,219, which is a continuation of Ser. No. 945,126, Sep. 15, 1992, abandoned.

[51] Int. Cl.$^6$ ............................................. B24D 3/02
[52] U.S. Cl. .............................. 51/298; 51/294; 51/295
[58] Field of Search .............................. 51/294, 295, 298

[56] References Cited

U.S. PATENT DOCUMENTS

| | | | |
|---|---|---|---|
| 1,355,834 | 10/1920 | John | 260/69 |
| 2,518,388 | 8/1950 | Simons | 154/45.9 |
| 2,958,593 | 11/1960 | Hoover et al. | 51/295 |
| 3,188,265 | 6/1965 | Charbonneau et al. | 161/188 |
| 3,781,172 | 12/1973 | Pett et al. | 51/309 |
| 3,849,949 | 11/1974 | Steinhauser et al. | 51/406 |
| 3,891,408 | 6/1975 | Rowse et al. | 51/295 |
| 3,893,826 | 7/1975 | Quinan et al. | 51/295 |
| 3,933,274 | 1/1976 | Emmons | 222/94 |
| 4,038,046 | 7/1977 | Supkis | 51/295 |
| 4,255,164 | 3/1981 | Butzke et al. | 51/295 |
| 4,386,943 | 6/1983 | Gümbel et al. | 51/298 |
| 4,505,720 | 3/1985 | Gabor et al. | 51/295 |
| 4,518,397 | 5/1985 | Leitheiser et al. | 51/293 |
| 4,563,388 | 1/1986 | Bonk et al. | 428/304.4 |
| 4,574,003 | 3/1986 | Gerk | 51/309 |
| 4,587,291 | 5/1986 | Gardziella et al. | 524/595 |
| 4,744,802 | 5/1988 | Schwabel | 51/309 |
| 4,748,043 | 5/1988 | Seaver et al. | 427/30 |
| 4,749,617 | 6/1988 | Canty | 428/332 |
| 4,761,441 | 8/1988 | Woodson | 523/409 |
| 4,770,671 | 9/1988 | Monroe et al. | 51/293 |
| 4,855,354 | 8/1989 | Mohler et al. | 525/54.24 |
| 4,881,951 | 11/1989 | Wood et al. | 51/309 |
| 4,903,440 | 2/1990 | Larson et al. | 51/298 |
| 4,904,753 | 2/1990 | Watts et al. | 528/137 |
| 4,906,523 | 3/1990 | Bilkadi et al. | 428/327 |
| 4,933,234 | 6/1990 | Kobe et al. | 428/336 |
| 4,939,008 | 7/1990 | Kemski | 428/34.3 |
| 5,061,294 | 10/1991 | Harmer et al. | 51/295 |
| 5,083,650 | 1/1992 | Seiz et al. | 192/107 M |
| 5,093,759 | 3/1992 | Davis et al. | 361/386 |

FOREIGN PATENT DOCUMENTS

| | | |
|---|---|---|
| 0501174 | 9/1992 | European Pat. Off. |
| 2203847 | 5/1974 | France |
| 0419812 | 11/1934 | United Kingdom |
| 1510781 | 5/1978 | United Kingdom |
| WO92/01018 | 1/1992 | WIPO |
| WO94/06839 | 3/1994 | WIPO |

OTHER PUBLICATIONS

Bordon Chemical Technical Brochure entitled, "Durite Abrasive Binder A18405". No Date Known.

Russian Author's Certificate No.: 738745, published Jun. 5, 1980.

Ebewele e al., *J. of Applied Polymer Science*, vol. 42, p. 2997 (1991).

Watson et al., *A Differential Scanning Calorimeter for Quantative Differential Thermal Analysis*, Anal. Chem., vol. 36, No. 4, pp. 1233–1238 (Jun. 1964).

Borden Trade Lit for AL–3029R, Durite Urea–Formaldehyde Resin, Date Nov. 1993.

A. Knop and W. Scheib, *Chemistry and Application of Phenolic Resins*, Springer–Verlag Berlin Heldelberg, New York, pp. 38–43. Date Unknown.

Derwent Publications Ltd., London, GB; English Abstract of JP 56 069 074, Jun. 10. 1981.

Derwent Publications Ltd., London, GB; English Abstract of JP 50 088 137, Jul. 15, 1975.

Patent Abstracts of Japan; English Abstract of JP 05 222 356, Aug. 31, 1993.

*Primary Examiner*—Deborah Jones
*Attorney, Agent, or Firm*—Gary L. Griswold; Walter N. Kirn; Doreen S. L. Gwin

[57] ABSTRACT

An abrasive article and methods for making such abrasive articles, including coated and nonwoven abrasive articles, comprising (a) a plurality of abrasive particles and (b) a bond system which adheres the plurality of abrasive particles together, the bond system comprising a binder; the binder being formed from a binder precursor essentially free of organic solvent, the binder precursor comprising a blend of an urea-aldehyde resin and a water dilutable resole phenolic resin, the blend being catalyzed by an acid catalyst system and, in particular, a coated abrasive comprising (a) a backing having a major surface, (b) a plurality of abrasive particles, and (c) a bond system which adheres the plurality of abrasive particles to the major surface of the backing, the bond system comprising a binder; the binder being formed from a binder precursor comprising a blend of an urea-aldehyde resin and a water dilutable resole phenolic resin, the blend being catalyzed by an acid catalyst, wherein the blend comprises from about 5 to about 90 weight percent of the water dilutable resole phenolic resin and from about 95 to about 10 weight percent of the urea-aldehyde resin.

29 Claims, No Drawings

ABRASIVE ARTICLES AND METHODS OF MAKING SAME

CROSS-REFERENCE TO RELATED APPLICATIONS

This application is a continuation-in-part application of assignee's Ser. No. 08/308,656, filed Sep. 19, 1994, which is a continuation-in-part of assignee's Ser. No. 08/300,854, filed Sep. 2, 1994, now U.S. Pat. No. 5,486,219 which is a file wrapper continuation of Ser. No. 07/945, 126, filed Sep. 15, 1992, now abandoned.

BACKGROUND OF THE INVENTION

1. Field of the Invention

This invention relates to improved abrasive articles comprising a plurality of abrasive grains and a bond system comprising a binder, the binder comprising a blend of an urea-aldehyde resin with a water dilutable resole phenolic resin, the blend being essentially free of organic solvent and catalyzed by an acidic catalyst system.

2. Discussion of Related Art

Abrasive articles typically comprise abrasive grains and may be in the form of a bonded abrasive article (i.e., a grinding wheel), a nonwoven abrasive article, or a coated abrasive article (e.g., sandpaper).

Generally, coated abrasives comprise a backing onto which a plurality of abrasive particles are bonded thereto. In one major form of the coated abrasive, the abrasive particles are secured to the backing by means of a first binder coat, called a make coating, which is adhered to the backing. Abrasive particles are applied while the make coating is in its uncured state, followed by precure of the make coating. A second binder coat, commonly called a size coating, is applied over the make coating and abrasive particles. The purpose of the size coating is to reinforce the abrasive particles.

In another form of a coated abrasive, the abrasive particles are dispersed in a binder to form an abrasive composite, and this abrasive composite is bonded to the backing by means of a binder. Coated abrasives are used in a variety of different applications from gate removal on forged metal parts to finishing eye glasses. Additionally, coated abrasives are converted into a wide variety of different forms including endless belts, sheets, cones, discs, and the like.

Nonwoven abrasives typically comprise a lofty, porous web having abrasive particles adhered thereto by means of a binder.

Bonded abrasives typically comprise a shaped matrix of abrasive particles in a binder.

Binder systems of abrasive articles present challenges to those skilled in the art who want to improve processing and performance of such abrasives. Binder systems employing single resin systems are known. For example, urea-formaldehyde was first patented for use as an adhesive for coated abrasives by Minnesota Mining and Manufacturing Company ("3M") in the mid 1930's (Great Britain Pat. No. 419,812). Since that time, a number of different coated abrasive products have been made with acid catalyzed UF resins. Typical catalysts used with urea-formaldehyde resins are aluminum chloride ($AlCl_3$) and ammonium chloride ($NH_4Cl$).

Although urea-aldehyde resins have enjoyed great success in coated abrasives, the need to reduce the use of solvents and unreacted reactants which contribute to release of volatile organic hydrocarbons (VOC) in the process of making coated abrasives, and the need to increase the quality of the abrasives while maintaining or increasing their level of performance is challenging the industry.

In addition, the appearance to the user of the abrasive article is important. For example, attempts to increase the abrading performance of coated abrasives employing urea-aldehyde resins using aluminum chloride alone as the catalyst, according to known techniques, requires a higher than normal temperature to cure the urea-aldehyde resin, which can lead to edge curling of paper-backed coated abrasives. Excessive curling may lead to an inoperable coated abrasive.

Another type of binder system includes phenolic resins. There are two basic types of phenolic resins: resole and novolak phenolic resins. Curing of resole phenolic resins can be accomplished by alkaline or acid catalysts as disclosed in A. Knop and W. Scheib, *Chemistry and Applications of Phenolic Resins,* Vol. 3, Springer-Verlog, New York, 1979. Acid catalysts for curing phenolic resins are disclosed, for example, in U.S. Pat. Nos. 4,587,291; 4,904,753; and 5,083,650. The need to reduce emissions of volatile organic compounds, however, is a factor with phenolic resins as well. One approach has been to increase the water compatibility of phenolic resins. J. D. Fisher, in an article entitled "Water Compatible Phenolic Resins" in Proceeding of the American Chemical Society, Division of Polymeric Material: Science and Engineering, No. 65, pp. 275–276 (1991), describes a method of making "water compatible" phenolic resins, their benefits, and their shortcomings.

Although the need to reduce emissions of volatile organic compounds has been recognized for individual resins, there is also a need to reduce such emissions when resins are blended. Such blends are desired to maximize the advantages of the individual resins.

In the manufacture of a coated abrasive article, many factors need to be balanced to make a high performing product. For example, the process conditions have a significant effect on the product performance. Traditionally, when urea-aldehyde resins and phenolic resins have been blended under basic conditions, the resulting blend is highly viscous, which can lead to processing problems, especially with finer grade coated abrasive articles (i.e., coated abrasive articles containing abrasive grains having a particle size of less than 50 micrometers, typically less than 30 micrometers). A high viscosity binder precursor is difficult to coat and can cause "flooding", i.e., excessive filling in between the abrasive grains. In addition, during the manufacture of a coated abrasive article, if the binder precursor is not homogenous, especially when resin blends are used, coating problems can result. Non-homogenous resins result in visual defects and performance defects in the finished product.

One method of making resins compatible is to add an organic solvent, which also lowers the viscosity of the binder precursor. However, organic solvents are not environmentally friendly.

U.S. Pat. No. 4,038,046 (Supkis) discloses an abrasive article having a binder precursor consisting of a blend of an urea-formaldehyde resin with a phenolic resin cured under basic conditions to achieve decreased loading, for example, when grinding certain materials such as wood.

A binder precursor system having processing advantages, such as reduced cure time and temperature, which can reduce or eliminate curl in the finished product of, for example, a coated or nonwoven abrasive article, as well as performance advantages, for example, improved cut and/or improved workpiece appearance is desired.

SUMMARY OF THE INVENTION

The present inventors have developed an acid catalyzable binder precursor system comprising a blend of resins which achieves desired processing and performance advantages. The time and temperature for cure of binder precursors of the present invention are generally not lengthy or high; curl is minimized or eliminated, and increased toughness and excellent cut performance is attained. As a result of the features of the present invention, the appearance and processability of the finished abrasive article is improved.

Furthermore, an abrasive article in accordance with the present invention achieves performance advantages, particularly when additional postcure is required, since the binder system derived from a binder precursor system comprising a resin blend maximizes the positive features and/or contributions of each of the individual resins, for example, hardness, antiloading properties, and heat-resistance.

In the present invention, it is unexpected and surprising that urea-aldehyde resins and phenolic resins of the present invention can be blended together homogenously as a binder precursor which is essentially free of solvent. A blend in accordance with the present invention is easy to process, has low viscosity, as defined herein, and exhibits high performance. Another advantage of the present invention pertains to curl. Typically, during thermal curing of an urea-aldehyde resin on a paper backing, the shrinkage of the urea-aldehyde causes undesirable curl. The use of a blend of urea-aldehyde resin with a phenolic resin minimizes or eliminates this curling.

A binder precursor system comprising a blend of resins in accordance with the present invention is water-based and essentially free of organic solvents and adjuvants. The benefits of a binder precursor system which is essentially free of organic solvent are believed to include cost, disposal, and health and safety, since water is less expensive than an organic solvent and does not engender the same disposal requirement nor create a human contact or pollution issue.

The present invention relates to an abrasive article comprising (a) a plurality of abrasive particles and (b) a bond system which adheres the plurality of abrasive particles together, the bond system comprising a binder; the binder being formed from a binder precursor essentially free of organic solvent, the binder precursor comprising a blend of an urea-aldehyde resin and a water dilutable resole phenolic resin, the blend being catalyzed by an acid catalyst system.

In one embodiment, the present invention relates to a coated abrasive comprising (a) a backing having a major surface, (b) a plurality of abrasive particles, and (c) a bond system which adheres the plurality of abrasive particles to the major surface of the backing, the bond system comprising a binder; the binder being formed from a binder precursor essentially free of organic solvent, the binder precursor comprising a blend of an urea-aldehyde resin and a water dilutable resole phenolic resin, the blend being catalyzed by an acid catalyst system.

In another embodiment, the present invention relates to a coated abrasive comprising (a) a backing having a major surface, (b) a plurality of abrasive particles, and (c) a bond system which adheres the plurality of abrasive particles to the major surface of the backing, the bond system comprising a binder; the binder being formed from a binder precursor comprising a blend of an urea-aldehyde resin and a water dilutable resole phenolic resin, the blend being catalyzed by an acid catalyst, wherein the blend comprises from about 5 to about 90 weight percent of the water dilutable resole phenolic resin and from about 95 to about 10 weight percent of the urea-aldehyde resin.

In another embodiment, the present invention relates to a nonwoven abrasive article having at least one major surface and an interior region, the nonwoven abrasive article comprising (a) an open lofty web of organic fibers, (b) a plurality of abrasive particles, and (c) a bond system which adheres the plurality of abrasive particles to the open lofty web, the bond system comprising a binder; the binder being formed from a binder precursor essentially free of organic solvent, the binder precursor comprising a blend of an urea-aldehyde resin and a water dilutable resole phenolic resin, the blend being catalyzed by an acid catalyst system.

The present invention also relates to a method of making a coated abrasive article comprising (a) providing a backing having at least one major surface, (b) applying a make coat precursor over the at least one major surface of the backing, (c) embedding a plurality of abrasive particles into and onto the make coat precursor, (d) at least partially curing the make coat precursor, (e) applying a size coat precursor, and (f) curing the size coat precursor; wherein at least one of the make coat precursor and the size coat precursor comprises a binder precursor comprising a blend of an urea-aldehyde resin and a water dilutable resole phenolic resin, the blend being catalyzed by an acid catalyst, the binder precursor being essentially free of an organic solvent.

DETAILED DESCRIPTION OF THE INVENTION

The term "bond system" as used herein refers to a material which adheres a plurality of abrasive particles together to form an abrasive article. The bond system comprises a binder derived from a binder precursor.

The term "binder precursor" means an uncured binder.

The term "coatable", as used herein, means that binder precursor compositions useful in the invention may be easily coated or sprayed onto substrates using coating devices which are conventional in the abrasives art, such as knife coaters, roll coaters, flow-bar coaters, electrospray coaters, die coaters, spray coaters, and the like. This characteristic may also be expressed in terms of viscosity of the binder precursor compositions. The viscosity of a coatable binder precursor composition of the present invention typically is low (the term "low" as used herein with respect to viscosity refers to a viscosity of about 2000 centipoise (cps) or less, measured using a Brookfield viscometer, number 3 spindle, 30 rpm, at room temperature (about 25° C.). More preferably, the viscosity ranges from about 35 to about 900 cps.

As used herein, the term "coatable binder precursor composition" means a coatable, homogeneous mixture including resin(s), catalyst or cocatalyst, water, any additives, which, upon curing, becomes a binder.

The term "percent solids" means the weight percent non-volatile material that would remain upon application of curing conditions. Percent solids below about 30% are not practical to use because of VOC emissions and/or cost to remove water, while above about 95% solids the binder precursor compositions can be difficult to render coatable, even when heated.

The term "essentially free of organic solvent" when referring to a binder precursor means that generally no more than about 10% organic solvent is present, typically no more than about 5%, preferably no more than about 2%, more preferably no more than about 1%, and most preferably 0%, organic solvent is present, in the binder precursor.

The term "cocatalyst" means a catalyst consisting essentially of a Lewis acid, preferably aluminum chloride ($AlCl_3$), and an organic amine salt or an ammonium salt. If an ammonium ion salt is used it is preferably ammonium chloride ($NH_4Cl$). Mixtures of inorganic and organic salts are typically, and in some cases, preferably utilized.

Urea-aldehyde resins useful in the invention may be "modified" or "unmodified" as those terms are known and used in the art. The term "modified" is meant to denote that the urea resin is modified by reaction with reagents such as furfuryl alcohol, melamine, or phenol during or following the reaction with the aldehyde.

It is important to note that the reactivity and cure of urea-aldehyde resins are dependent on factors including the aldehyde/urea ratio of the resin, type of catalyst, catalyst concentration, pH (defined as negative base ten logarithm of the hydrogen ion concentration) of the binder precursor compositions after addition of other additives, and the time and temperature used for curing. As mentioned previously, another important factor appears to be the amount of "free" aldehyde. As urea-aldehyde resins currently preferred for use in coatable compositions typically have low free aldehyde content for environmental purposes, a need has arisen for an improved catalyst that will work well with this type of resin. Similarly, the reactivity and cure of phenolic resins are dependent on factors including the type of catalyst, catalyst concentration, pH (defined as negative base ten logarithm of the hydrogen ion concentration) of the binder precursor compositions after addition of other additives, and the time and temperature used for curing

Bond System

A bond system in accordance with the present invention comprises a binder derived from a binder precursor comprising a blend of an urea-aldehyde resin and a phenolic resin as described herein.

Urea-Aldehyde Resins

Urea-aldehyde resins employed in the coatable binder precursor compositions useful in the invention may be prepared by the reaction of urea or any urea derivative with any aldehyde which are capable of being rendered coatable, have the capability of reacting at an accelerated rate in the presence of a catalyst or cocatalyst, and which afford an abrasive article with abrading performance acceptable for the intended use. The resins comprise the reaction product of an aldehyde and a "urea" (as further defined herein). Urea-formaldehyde resins are preferred in the abrasive industry, as noted above, because of their mechanical and thermal properties, availability, low cost, and ease of handling. The urea-aldehyde resins preferably are 30–95% solids, more preferably 60–80% solids, with a viscosity ranging from about 125 to about 1500 cps (Brookfield viscometer, number 3 spindle, 30 rpm, 25° C.) before addition of water and catalyst and have molecular weight (number average) of at least about 200, preferably varying from about 200 to 700.

A particularly preferred urea-aldehyde resin for use in the present invention is that known under the trade designation "AL3029R", from Borden Chemical. This is an unmodified (i.e. contains no furfuryl alcohol) urea-formaldehyde resin at 65% solids, viscosity (Brookfield, #3 spindle, 30 rpm, 25° C.) of 325 cps, a free formaldehyde content of 0.1–0.5 weight percent, and a molar ratio of formaldehyde to urea ("F/U ratio") of ranging from about 1.4:1.0 to about 1.6:1.0.

Preferred and particularly preferred ranges for ingredients of useful binder precursor compositions employing the urea-formaldehyde resin known under the trade designation "AL3029R" for producing paper-backed coated abrasives are shown in Table A.

TABLE A

| Paper-Backed Coated Abrasives Preferred binder precursor formulations including the cocatalyst system, in weight percent | | |
|---|---|---|
| | Preferred | More Preferred |
| AL3029R (65% solids) | 70–95 | 80–95 |
| $H_2O$ | 5–10 | 7–8 |
| $NH_4Cl$ (25% solids) | 3–6 | 4–5 |
| $AlCl_3$ (28% solids) | 0.1–1.0 | 0.5–0.7 |

More particularly, preferred urea-aldehyde resins in the resin blend of the present invention comprise a non-solidified urea-aldehyde resin having low free aldehyde weight percent and a cocatalyst, the urea-aldehyde resin having an aldehyde/urea molar ratio of at least about 1.0:1.0, more preferably ranging from about 1.0:1.0 to about 2.0:1.0. As used herein the term "low free aldehyde" means the free aldehyde ranges from about 0.1 to about 3.0 weight percent, more preferably ranging from about 0.1 to about 1.0 weight percent, based on weight of original aldehyde in the resin. "Free aldehyde" as used herein means that weight percent of the total weight of the resin solution that is not reacted with urea.

Aldehydes

Aldehydes which are useful in the invention include cyclic and straight and branched chain alkyl and alkylene aldehydes, and aromatic aldehydes. Preferably, the aldehydes have molecular weight below about 300 to afford a less viscous binder precursor composition. Examples of suitable aldehydes include formaldehyde, benzaldehyde, propanal, hexanal, cyclohexane carboxaldehyde, acetaldehyde, butyraldehyde, valeraldehyde, and other low molecular weight aldehydes. Preferred is formaldehyde, for its availability, low cost, cured resin properties, and because it affords low viscosity binder precursor compositions.

Ureas, Urea Derivatives, and Thioureas

"Urea" as used in accordance with the invention is not limited to urea ($H_2NCONH_2$), but is meant to include straight and branched chain urea derivatives and cyclic urea derivatives, as well as thioureas. Urea-derivatives useful in the invention preferably have at least one functional group which is reactive with the aldehyde. Although urea is preferred for use in the coatable binder precursor compositions due to its aforesaid advantages in abrasive articles, it is sometimes advantageous to substitute an urea derivative for a portion of the urea to modify physical properties of the resultant abrasive article and/or to reduce emissions of VOC (such as unreacted free aldehyde). Useful urea derivatives may be selected from the group consisting of compounds represented by the general formula:

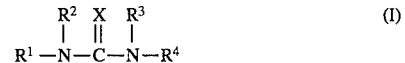

and mixtures thereof wherein X is either O or S, each of $R^1$, $R^2$, $R^3$, and $R^4$ is a monovalent radical selected from the group consisting of hydrogen, alkyl groups having 1 to about 10 carbon atoms, hydroxyalkyl groups having from about 2 to 4 carbon atoms and one or more hydroxyl groups, and hydroxypolyalkyleneoxy groups having one or more hydroxyl groups, and with the provisos that:
(1) said compound contains at least one —NH and one —OH group or at least two —OH groups or at least two —NH groups;
(2) $R^1$ and $R^2$ or $R^1$ and $R^3$ can be linked to form a ring structure; and
(3) $R^1$, $R^2$, $R^3$, and $R^4$ are never all hydrogen at the same time.

Preferred urea derivatives, if used, include those wherein $R^1$ is 2-hydroxyethyl, $R^2$ and $R^3$ are linked to form an ethylene bridge, and $R^4$ is hydrogen, which forms hydroxyethyl ethylene urea or HEEU. Other representative urea derivatives within the general formula include N-2-hydroxyethyl-N'-butyl urea, N,N'-bis-(2-hydroxyethyl)-N'-butyl urea, and N,N'-bis(2 hydroxyethyl)urea. Other urea derivatives useful in the present invention are listed in column 7 of U.S. Pat. No. 5,039,759, which is incorporated herein by reference. HEEU is available under the trade designation "UCAR RD-65-2", from Union Carbide Corporation.

Representative examples of thioureas which are useful in the practice of the present invention are thiourea compounds represented by general formula (I) above only wherein X=S.

Preparation of the above mentioned ureas and thioureas proceeds by methods known in the art. For example, preparation of N-(2-hydroxyethyl)-N, N'-ethylene urea may proceed by reacting equimolar mixtures of amino ethyl ethanolamine and dimethyl carbamate in a nitrogen purged vessel with heating (about 80° C.). The mixture is stirred for about three hours before being allowed to stand overnight. The mixture is then heated again while recovering methanol and other volatile materials up to about 195° C. The material remaining in the vessel is then subjected to vacuum distillation, producing distillation of the urea. Details on preparing this and other ureas are disclosed in U.S. Pat. No. 5,039,759, columns, 9–13, which are incorporated herein by reference.

Water Dilutable Resole Phenolic Resin

A phenolic resin of the present invention if formed from a reaction of phenol and formaldehyde. A portion of the phenol can be substituted with other aromatic groups such as resorcinol, m-cresol, 3,5-xylenol, t-butyl phenol and p-phenylphenol. Likewise a portion of the formaldehyde can be substituted with other aldehyde groups such as acetaldehyde, chloral, butylaldehyde, furfural or acrolein. Phenol and formaldehyde are the most preferred constituents in the phenolic resin due to their high reactivity, limited number of side chain reactions and low cost.

It is theorized that the phenolic resin polymerization occurs by the following idealistic mechanism. The phenol and formaldehyde react to form a mixture of phenolic alcohols and methylol derivatives with the methylol groups in the ortho and para positions. Then these products react with the excess formaldehyde and condense with each other or other phenol groups to form the a complex mixture of various methylolated phenol compounds. Upon further heating, the free methylol groups crosslink with one another and water is given off to form a cured polymer network.

The structure and the number of methylol groups of a resole phenolic resin are dependent on the formaldehyde-phenol ratio, duration and temperature of the reaction type and concentration of basic catalyst. When cured, these resole phenolic resins are thermosetting resins, and exhibit excellent toughness, dimensional stability, strength, hardness and heat resistance.

A phenolic resin in accordance with the present invention generally has a molar ratio of aldehyde to phenol of greater than or equal to 1:1, typically from 1:1 to 3:1. Suitable resole phenolic resins are water dilutable compositions which preferably consist essentially of the reaction product of phenol and formaldehyde. Preferred base catalyzed phenolic binder precursors useful for blending with urea-formaldehyde resins in the invention include those with a molar ratio of formaldehyde to phenol between 1.6:1.0 to 2.5:1.0, preferably between 1.6:1.0 to 2.2:1.0, most preferably between about 1.8:1.0 to about 2.0:1.0. A preferred phenolic resin composition includes a 75% solids condensate of a 2.0:1.0 formaldehyde:phenol mixture.

A phenolic resin of the invention typically contains 0–6.5% free phenol by weight of the phenolic resin. The amount of free phenol can be measured by HPLC (High Performance Liquid Chromatography) or GC (Gas Chromatography).

A phenolic resin of the present invention typically has a free formaldehyde level of between 0–3.5% by weight, based on the weight of the phenolic resin. The amount of free formaldehyde can be measured by GC (Gas Chromatography) or the Ullman Test (hydroxyl amine hydrochloride test).

A phenolic resin of the present invention typically is between 70 to 85% solids, preferably between 72 to 82% solids; the remainder typically being water. If the % solids are too low, more energy may be required to remove the water; if the % solids are too high, the resulting phenolic resin may have a viscosity that prevents successful processing. Percent solids can be measured by gradually heating a pre-weighed phenolic resin sample over sufficient time to remove all volatiles. Then after heating, the phenolic resin sample is weighed and this weight is subtracted from the initial weight to determine percent solids.

A phenolic resin of the present invention typically contains a base catalyst. The presence of this base catalyst speeds up the reaction or polymerization rate of the phenolic resin. The pH of the phenolic resin should range between 6 to 12, preferably between 7 to 10 and most preferably between 7 to 9. Examples of such basic catalysts include sodium hydroxide, potassium hydroxide, calcium hydroxide, magnesium hydroxide, barium hydroxide and combinations thereof. The preferred basic catalyst is sodium hydroxide. The amount of basic catalyst should be less than 5%, preferably less than 2%, more preferably less than 1% and most preferably between 0.5 to 0.9% by weight of tile phenolic resin.

Acid-curable phenolic resins which are preferred for the practice of this invention are alkaline condensed, reaction products of phenols and aldehydes, wherein both mono- or polynuclear phenols may be used. In further detail, mononuclear phenols, such as phenol itself, and also its alkyl substituted homologs, such as o-, m-, p-cresol or xylenols, are suitable. Also suitable are halogen substituted phenols, such as chloro- or bromophenol and polyfunctional phenols, such as resorcinol or pyrocatechol. The term "polynuclear phenols" refers, on the one hand, for example, to naphthols, i.e., compounds with fused rings. On the other hand, however, "polynuclear phenols" for the purposes of this invention can include phenols linked by aliphatic bridges or by hetero atoms, such as oxygen. Polyfunctional, polynuclear phenols also provide suitable thermosetting resole phenolics.

A phenolic of the present invention preferably has a water tolerance, as measured by the water tolerance test described below, of at least 100%, preferably 150% or greater, more preferably 190% or greater.

Water Tolerance Test

The amount of water (percent by weight of resin) that a phenolic resin will tolerate before phase separation serves as an indicator as to how much water may be added as solvent and how far the resin has advanced in molecular weight. A 50.0 gram sample of resin can be added to a 250 ml beaker at 25° C. and the beaker with contents can be weighed. With the sample mixing via a magnetic stirrer, small increments of distilled water can be added, allowing the resin to mix with the water after each water addition until a homogeneous mixture is reached. The endpoint occurs when the resin/water solution begins to turn permanently milky in appearance, i.e., when the water and resin cannot be mixed without a milky appearance remaining after stirring. After the endpoint is reached, the beaker and contents can be weighed and the water tolerance calculated as (A-B)×100%, where A=final weight of beaker contents and B=initial weight of resin.

Blend of Urea-Aldehyde and Phenolic Resins

A phenolic resin, as described above, which is blended with an urea-aldehyde resin, is a basic phenolic; acid catalysis occurs after blending a phenolic resin and an urea-aldehyde resin and adding an acid catalyst. Blending can be accomplished by any conventional technique such as an air stirrer, high shear mixer, ball mill, and the like. While the order of addition of the phenolic resin and the urea-aldehyde resin of the present invention is not critical, typically the phenolic resin is added to the urea-aldehyde resin. Subsequently, an acid catalyst, preferably a cocatalyst, as described herein is added to the blend. If a cocatalyst comprising a salt and a Lewis acid can be added, typically the salt is added first followed by the Lewis acid. Any additional water can be added after the addition of the acid catalyst or cocatalyst.

A blend in accordance with the present invention can contain up to 95% urea-aldehyde and up to 90% phenolic. Preferably, a blend comprises from about 5 to about 90 weight percent, more preferably 10 to 60 weight percent, most preferably 15 to 40 weight percent, of a water dilutable resole phenolic resin, and from about 95 to about 10 weight percent, more preferably 90 to 40 weight percent, most preferably 85 to 60 weight percent, urea-aldehyde resin. Typically, weight percentages of phenolic resin higher than 25% may require an increased acid catalyst concentration to neutralize the caustic properties of the phenolic resin.

A blend in accordance with the present invention, after addition of an urea-aldehyde resin and a phenolic resin, as described above, and any additional water, typically has a % solids ranging from about 40 to about 72%, preferably 50 to 70%, more preferably 55 to 68%.

A latex can be added to a blend of the present invention. The amount of latex added to the blend preferably ranges from 1 to 20 weight percent, based on the weight percent of the blend, more preferably from 5 to 15 weight percent. In other words, a portion of the resin blend is substituted with the latex.

Useful acrylic latices include those which are 50–99 percent by weight solids water emulsions. Suitable latices include those known under the trade designation "Airflex 421" available from Air Products & Chemicals, Inc., which comprises vinyl acetate-ethylene copolymer. Further examples of latices (sometimes referred to as resin emulsions) that can be included in the blend of the present invention include acrylonitrile-butadiene copolymer emulsions, acrylic emulsions, vinyl acetate emulsions, butadiene emulsions, butadiene-styrene emulsions and combinations thereof. These resin emulsions are commercially available from a variety of different sources including those acrylic resin emulsions known under the trade designations "Rhoplex" and "Acrylsol", commercially available from Rohm and Haas Company; the acrylic latices known under the trade designations "Flexcryl" and "Valtac", commercially available from Air Products & Chemicals Inc.; the acrylic latices known under the trade designations "Synthemul" and "Tylac", commercially available from Reichold Chemical Co.; the acrylic and nitrile latices known under the trade designations "Hycar", and the styrene/butadiene latex known under the trade designation "Goodrite", commercially available from B. F. Goodrich; the latex known under the trade designation "Chemigum", commercially available from Goodyear Tire and Rubber Co.; the latex "Neocryl" commercially available from ICI; the latex known under the trade designation "Butafon", commercially available from BASF; vinyl acetate homopolymer and vinyl acetate/ethylene copolymer emulsions known under the trade designations "VINAC" commercially available from Air Products & Chemicals Inc.; and the latex known under the trade designation "Res", commercially available from Union Carbide.

The latices or resin emulsions are typically and preferably 100 percent water based and preferably do not contain any organic solvent for the purposes of this invention. However, some latex or resin emulsions may contain a minor amount, i.e., less than 10 weight percent, preferably less than 5 weight percent, and more preferably less than 1 weight percent, organic solvent. Two resins suitable to mix with the resin blend of the present invention are: (1) the resin known under the trade designation "VINAC 281", a polyvinyl acetate homopolymer, and (2) the resin known under the trade designation "Airflex 421 ", a vinyl acetate/ethylene copolymer, both available from Air Products & Chemicals, Inc., Allentown, Pa. It is also within the scope of this invention that more than one latex or resin emulsion may be included in a resin blend of the present invention.

The ratio on a solids basis of resin blend to latex (latices) or resin emulsion(s) typically ranges from about 60 to about 95 percent resin blend to about 5 to about 40 percent latex (latices) or resin emulsion(s), preferably 80 to 95 percent resin blend to about 5 to 20 percent latex (latices) or resin emulsion(s).

A blend of the present invention generally contains water as a solvent in an amount, by weight, ranging from about 20 to about 60%, preferably 25 to 45%, based on the combined weight of water and resin blend. Examples of useful water include tap water and deionized water.

The present invention is believed to achieve both processing and performance advantages based on the presence of both a phenolic resin and an urea-aldehyde resin. A phenolic resin of the blend is believed to enhance water and heat resistance, toughness, and flexibility of a binder system and minimize shrinkage, which in turn provides less or no curling of the abrasive article. An urea-aldehyde resin of the blend is believed to contribute, for example, mechanical and thermal properties, antiloading properties, and ease of handling. In addition, the acid catalyzed blend of resins is believed to be able to be cured at lower temperature and time periods, which in turn eliminate or reduce curl of the finished product.

Once blended, the combination of urea-aldehyde resin and water-dilutable phenolic resin are acid catalyzed and cured, for example, thermally, to form a binder.

Acid Catalyst Systems

A catalyst useful to catalyze the cure of the blend of urea-aldehyde resin and phenolic resin of the present invention includes acid catalysts such as mineral salts of strong acids such as $NH_4Cl$ (strong acids include, e.g., sulfuric, nitric, and phosphoric acids), minerals salts of Lewis acids such as $AlCl_3$, para-toluene sulfonic acid (pTSA), phenol sulfonic acid, and salts of sulfonic acids. Since, typically, as the pH of the binder precursor system decreases, the pot life of the system decreases, the pH of an acid catalyzed resin blend of the present invention preferably ranges from 2.0 to 5.0, more preferably from 3.5 to 4.5. While the pH of the binder precursor system can be selected to fully cure both the urea-aldehyde resin and the phenolic resin, it is within the scope of the present invention to only partially cure the phenolic resin in the blend. The term "partially cure" as used herein means that the resins of the blend are not completely crosslinked. In a partial cure, the resins are sufficiently cross-linked such that they are solidified to a degree that the resulting construction can be further processed to form a coated abrasive, as would be understood by one skilled in the art.

Preferably, the acid catalyst is a cocatalyst as described below. Preferably, the cocatalyst is a combination of $NH_4Cl$ (typically 25% solids) and $AlCl_3$ (typically 28% solids) used at a weight ratio to achieve a pH of the acid catalyzed resin blend as described above, i.e., preferably 2.0 to 5.0, more preferably from 3.5 to 4.5. For example, the cocatalyst can be a combination of $NH_4Cl$ and $AlCl_3$ in a wet weight ratio of about 9:1 to about 4:1, preferably 8:1 to 5:1.

The ratio, in weight percent, of catalyst to resin blend is typically based on the desired pH of the system since catalysis, i.e., rate of cure, is pH-dependent. Therefore, this ratio depends on the catalyst selected and the concentration of urea-aldehyde resin and phenolic resin in the blend, and, consequently, the concentration of base catalyst from the phenolic resin, in the blend. Thus, the ratio of catalyst to resin blend will fall within a range which preferably achieves an acid catalyzed blend pH of 2.0 to 5.0, more preferably 3.5 to 4.5.

Cocatalyst Systems

Lewis Acid Component

Binder precursor compositions useful in the invention preferably employ a cocatalyst system consisting essentially of a Lewis acid, preferably aluminum chloride ($AlCl_3$), and an organic or inorganic salt. A Lewis acid catalyst is defined simply as a compound which accepts an electron pair, and preferably has an aqueous solubility at 15° C. of at least about 50 grams/100 cc.

Preferred are those Lewis acids (or compounds which behave as Lewis acids) selected from the group consisting of aluminum chloride, iron (III) chloride, and copper (II) chloride. Particularly preferred is the Lewis acid, aluminum chloride, in either its non-hydrated form ($AlCl_3$) or hexahydrate form ($AlCl_3 \cdot 6H_2O$).

The Lewis acid is typically and preferably used in the binder precursor solutions at an amount ranging from about 0.1 to about 5.0 weight percent of the total weight of binder precursor, as a 20–30 % solids aqueous solution. If aluminum chloride ($AlCl_3$) is used, it has been found that 0.6 weight percent of a 28 % solids aqueous solution of $AlCl_3$ gives excellent results.

Salt Component

Ammonium Ion Salts

Cocatalysts useful in the invention consist essentially of a Lewis acid, preferably aluminum chloride ($AlCl_3$), and an aqueous organic amine salt or an ammonium ion salt. If an ammonium ion salt is used it is preferably a salt of ammonium ion ($NH_4^+$) and a halide ion such as chloride ion ($Cl^-$), fluoride ion ($F^-$), bromide ion ($Br^-$), and the like. A particularly preferred ammonium ion salt is ammonium chloride ($NH_4Cl$). Binder precursors in accordance with the invention preferably employ an ammonium ion salt having an aqueous solubility at 0° C. of at least about 20 grams/100 cc.

Ammonium sulfate (($NH_4)_2SO_4$), ammonium peroxydisulfate (($NH_4)_2S_2O_8$), ammonium thiosulfate (($NH_4)_2S_2O_3$), and ammonium nitrate ($NH_4NO_3$) are deemed suitable for use in the invention as useful ammonium ion salts when used specifically in combination with $AlCl_3$ as cocatalyst. In particular, although the cocatalyst $AlCl_3/(NH_4)_2SO_4$ showed little improvement compared with use of $AlCl_3$ as catalyst alone in terms of coated abrasive performance, it was surprisingly found that a coated abrasive made using this cocatalyst did not diminish performance.

The weight ratio of Lewis acid to ammonium ion salt typically and preferably ranges from about 0.6:1 to about 0.15:1 on a dry weight basis.

Ammonium ion salts are used in the binder precursor compositions of the invention at an amount ranging from about 0.5 to about 5.0 weight percent of the total solids weight of the composition, as a 20–30 weight percent solids aqueous solution. If ammonium chloride is used as the ammonium ion salt as preferred, it has been found that 2.0 weight percent, as a percentage of total weight of solids, as a 25 weight percent solids aqueous solution gives excellent results.

Organic Amine Salts

It may be desirable to use as the salt component a linear or branched chain organic amine salt of the type having a plurality of methylene units separating terminal amine groups. Organic amine salts render flexibility to the finished abrasive articles of the invention. Preferred linear organic amine salts are those selected from the group of compounds having the general formula $$(X^-)^+H_3N(CH_2)_nNH_3^+(Y^-)$$

wherein X and Y are halide atoms that may be the same or different and n is an integer ranging from about 3 to about 10. An example of such a linear organic amine salt found useful by the inventors herein is the dichloride salt of hexamethylene diamine, obtained by the acidification of an aqueous solution of hexamethylene diamine with hydrochloric acid (HCl). One branched chain organic amine salt found useful is that known under the trade designation "Dytek-A", available from du Pont, which is commonly known as 2-methyl-pentamethylene diamine.

Mixtures of ammonium ion salts and organic amine salts are typically, and in some cases, preferably utilized in the binder precursor compositions. For example, the salt component of the cocatalyst may be comprised of 50 percent ammonium chloride, 50 percent dichloride salt of hexamethylene diamine, on a weight basis.

Optional Ingredients

Typically and preferably, a solvent is added as needed to render the binder precursor compositions useful in the invention coatable. The solvent is typically and preferably water. Any optional solvent should be essentially free of organic solvent, as defined above, so that the binder precursor system is essentially free of organic solvent. When water is used solely as the solvent it is preferably added up to the water tolerance of the binder precursor solution, although this is not necessary to render the compositions coatable.

Coatable binder precursor compositions useful in the present invention can contain additives such as fillers, fibers, lubricants, grinding aids, antistatic agents, wetting agents, surfactants, pigments, dyes, coupling agents, plasticizers, and suspending agents. The amounts of these materials are selected to give the properties desired. Alternatively, useful binder precursor compositions may be formulated without these additives, and the additives mixed into the binder precursor just prior to coating onto a substrate. Suitable optional ingredients should not affect the desired pH of the resin blend. If the desired additives do affect pH, then the binder precursor should be formulated to obtained a suitable pH range as defined herein. Typically the optional ingredients will be neutral or acidic.

Fillers are frequently used in abrasive articles to reduce cost and improve dimensional stability and other physical characteristics. Fillers can be selected from any filler material that does not adversely affect the theological characteristics of the binder precursors or the abrading performance of the resulting abrasive article. Examples of fillers include calcium sulfate, aluminum sulfate, alumina trihydrate, cryolite, magnesia, kaolin, quartz, and glass. Fillers that function as grinding aids are cryolite, potassium fluoroborate, feldspar, and sulfur. Fillers can be used in varying amounts limited only by the proviso that the abrasive article retains acceptable mechanical properties (such as flexibility and toughness).

Abrasive Articles

Abrasive articles typically comprise a plurality of abrasive particles adhered by a bond system comprising a binder which can be derived from a binder precursor as described above.

Abrasive Particles

Abrasive particles useful in the invention can be of any conventional grade utilized in the formation of coated and open, lofty nonwoven abrasives and can be formed of, for example, flint, garnet, aluminum oxide, ceramic aluminum oxide, alumina zirconia (including fused alumina zirconia such as disclosed in U.S. Pat. Nos. 3,781,172; 3,891,408; and 3,893,826, commercially available from the Norton Company of Worcester, Mass., under the trade designation "NorZon"), diamond, silicon carbide (including refractor3, coated silicon carbide such as disclosed in U.S. Pat. No. 4,505,720), alpha alumina-based ceramic material (available from Minnesota Mining and Manufacturing Company under the trade designation "CUBITRON") as disclosed in U.S. Pat. Nos. 4,518,397; 4,574,003; and 4,744,802; 4,770,671; 4,881,951, 5,011,508, or mixtures thereof. The abrasive particles may be individual abrasive grains or agglomerates of individual abrasive grains. The frequency (concentration) of the abrasive grains on the backing is also conventional. The abrasive grains can be oriented or can be applied to the backing without orientation, depending upon the requirements of the particular coated abrasive product.

The choice of abrasive particle type and size is somewhat dependent on the surface finish desired. The surface finish of the workpiece may be determined before and after abrasion by mounting the workpiece in the specimen holder of a profilometer instrument, such as that known under the trade designation "Rank Surtronic 3", available from Rank Taylor-Hobson, Leicester, England. $R_{tm}$, which is the mean of the maximum peak-to-valley values from each of 5 sampling lengths, is typically recorded for each test. It is desirous to produce a coated abrasive that exhibits an increase in cut while producing an acceptable surface finish on the workpiece.

Coated Abrasive Articles

Coated abrasive articles of the invention may be produced with coatable binder precursor compositions, described above, on a backing. A coated abrasive article of the present invention can comprise an abrasive composite which comprises a binder derived from the binder precursor system of the present invention and abrasive particles. The adhesion of the abrasive composite to the backing should also be sufficient to prevent significant shedding of individual abrasive particles or the abrasive coating during normal use. Alternatively, a coated abrasive article can comprise a make coat, with abrasive particles applied therein and thereon, and a size coat, at least one of the make coat and the size coat being derived from the binder precursor system of the present invention.

The backing can be any number of various materials conventionally used as backings in the manufacture of coated abrasives, such as paper, cloth, film, vulcanized fiber, woven and nonwoven materials, and the like, or a combination of two or more of these materials or treated versions thereof. The choice of backing material will depend on the intended application of the abrasive article. The strength of the backing should be sufficient to resist tearing or other damage in use, and the thickness and smoothness of the backing should allow achievement of the product thickness and smoothness desired for the intended application. The backing may comprise a polymeric film, paper sheet, or laminate of paper sheet and fabric nonwoven. In some applications it is also preferable that the backing be waterproof. The thickness of the backing should be sufficient to provide the strength desired for the intended application; nevertheless, it should not be so thick as to affect the desired flexibility in the coated abrasive product. It is preferred that the backing be a polymeric film, such as polyester film, for lapping coated abrasives, and that the film be primed with a material, such as ethylene acrylic acid copolymer, to promote adhesion of the abrasive composite thereto. In order to promote adhesion to primed polymeric film, either the make coat can comprise the resin blend of the present invention or, if the size coat comprises the resin blend of the present invention, a latex, as described herein can be used in the make coat.

Suitable paper for use in coated abrasives of the invention, particularly when a fabric nonwoven is to be used as a shelling-resistant layer, include the 150 grams per square meter buff colored paper available from Monadnock Paper Mills, Inc., Bennington, N.H., known under the trade designation "High Internal Bond Fourdrinier Paper." This paper has a thickness ranging from about 190 to about 206 micrometers, although useful thicknesses range from about 100 to about 300 micrometers. Paper backings useful in the invention preferably have Gurley porosity values ranging from about 10 to about 40 seconds per 100 cc air passage, more preferably ranging from about 15 to about 25 seconds per 100 cc of air passage, measured in accordance with FTMS No. 191, Method 5452 (12/31/68) (as referred to in the *Wellington Sears Handbook of Industrial Textiles* by E. R. Kaswell, 1963 Ed., p. 575) using a Gurley Permeometer (available from Teledyne Gurley, Inc., Troy, N.Y.). The paper can be mechanically or chemically primed to enhance adhesion of the adhesive thereto.

Suitable polymeric films for use in the articles of the invention include polyesters, polyolefins, polyamides, polyvinyl chloride, polyacrylates, polyacrylonitrile, polystyrene, polysulfones, polyimides, polycarbonates, cellulose acetates, polydimethyl siloxanes, polyfluorocarbons, and blends and copolymers thereof, such as copolymers of ethylene and acrylic acid, copolymers of ethylene and vinyl acetate. These polymeric films may contain additives, colorants, fillers, crosslinking agents, dispersants, plasticizers, and mixtures thereof, and the films may be oriented or unoriented. Another example of a polymeric film is disclosed in U.S. Pat. No. 5,304,224. Useful polymeric films have thickness ranging from about 0.01 mm to 0.25 mm, more preferably about 0.05 min. One particularly preferred class of films includes those which are "microvoided." As used herein, "microvoided" means the film has internal porosity. A particularly preferred film is microvoided polyester (preferably polyethylene terephthalate) film having thickness ranging from 0.01 mm to 0.25 mm, more preferably about 0.05 mm. One microvoided polyester film useful in the invention is that known under the trade designation 475/200 MELINEX MV available from ICI Limited, United Kingdom.

If required, priming of the film can be accomplished by surface alteration or by a chemical primer. Examples of surface alterations include corona treatment, UV treatment, electron beam treatment, flame treatment, and scuffing to increase the surface area.

One class of useful chemical primers are the primer/adhesives taught in U.S. Pat. No. 4,906,523 incorporated herein by reference. The primer/adhesives can comprise a colloidal dispersion of (1) one or more thermoplastic elastomers that are soluble in at least one proton accepting solvent (for example polyester-polyurethanes, polyether-polyurethanes, homopolymers and copolymers of acrylate esters such as poly(ethyl acrylate) and poly(ethyl acrylate-ethylene) nitrile rubbers such as poly(butadiene acrylonitrile) chlorosulfonated polyolefins, and fluorocarbon elastomers), (2) one or more colloidal inorganic oxides, particularly silicon dioxide, present as an organosol, and (3) a volatile solvent mixture comprising (a) one or more organic proton accepting solvents preferably having a boiling point of 100° C. or less at atmospheric pressure, (for example acetone, methyl ethyl ketone, methyl t-butyl ether, ethyl acetate, acetonitrile, tetrahydrofuran) and (b) one or more organic, hydroxy group-containing solvents, preferably having a boiling point of 125° C. or less at atmospheric pressure (for example water and alkanols, such as methanol, ethanol, propanol, isopropanol, 2-ethoxyethanol, and 2-propoxyethanol).

Another class of useful chemical primers are aziridine-type materials as disclosed in U.S. Pat. Nos. 4,749,617 and 4,939,008, both incorporated herein by reference. These patents describe compositions useful in adhering two items together, the composition of the '671 patent comprising an aziridine-functional material and an organic resin (such as polyvinyl chloride, methyl methacrylate, urethane polymers, and polyester resins) wherein the aziridine-functional material and the organic resin are present in a weight ratio such that there is at least 0.1 part of the resin present for each part of the aziridine-functional material. The composition of the '008 patent is an aziridine-functional material essentially free of other organic resins.

Specific examples of useful aziridine-functional materials include trimethylol-tris{-(N-[methylaziridinyl])}propionate, 1,1'-(1,3-phenylenecarbonyl)bis [2-methyl aziridine], and the like, while specifically useful organic resins include the polyester-functional urethanes known under the trade designation "Estane" from B. F. Goodrich.

Coated abrasive articles made in accordance with this invention can also include such modifications as are known in this art. A suitable attachment system can be included on a coated abrasive article. For example, a back coating such as a pressure-sensitive adhesive (PSA) can be applied to the non-abrasive or back side of the backing, and various supersize coatings, such as a metal stearate, e.g., zinc stearate, can be applied over the abrasive surface (e.g., over the size coat) to prevent abrasive loading; alternatively, the supersize coating can contain grinding aids to enhance the abrading characteristics of the coated abrasive, or a release coating to permit easy separation of PSA from the coated abrasive surface in cases where the coated abrasive is in the form of a roll of abrasive sheets, as illustrated in U.S. Pat. No. 3,849,949, incorporated by reference herein.

Representative PSAs useful for abrasive articles of the invention include latex crepe, rosin, acrylic polymers and copolymers such as polybutylacrylate and the like, polyacrylate esters, vinyl ethers such as polyvinyl n-butyl ether and the like, alkyd adhesives, rubber adhesives such as natural rubber, synthetic rubber, chlorinated rubber, and the like, and mixtures thereof. A particularly preferred type of PSA is a copolymer of isooctylacrylate and acrylic acid. Alternatively, the backside, i.e., the side opposite the abrasive material, of the coated abrasive may contain a hook and loop attachment system. The backsize may contain either hook or loop fabric.

In the coated abrasive embodiments of the invention it is common and sometimes preferable to utilize a "nonloading" or "load-resistant" supersize coating. "Loading" is the term used in the abrasives industry to describe the filling of spaces between the abrasive particles with swarf (the material abraded from the workpiece) and the subsequent build-up of that material. For example, during wood sanding, swarf comprised of particles becomes lodged in the spaces between abrasive particles, dramatically reducing the cutting ability of the abrasive particles. Examples of such loading resistant materials include metal salts of fatty acids, urea-formaldehyde resins, waxes, mineral oils, crosslinked siloxanes, crosslinked silicones, fluorochemicals, and combinations thereof. Particularly preferred load resistant supersize coatings contain zinc stearate or calcium stearate in a cellulosic binder.

Coated abrasives of the present invention may utilize any suitable resin adhesives for coatings not employing a binder precursor composition as described above. Examples of other typical and preferred resinous adhesives include acid and base-cured phenolic resins, aminoplast resins, melamine resins, epoxy resins, polyurethane resins, isocyanurate resins, urea-formaldehyde resins, isocyanurate resins, radiation-curable resins (i.e., resins made using one or more unsaturated monomers) such as acrylated urethane resins, acrylated epoxy resins, and the like, resin emulsions as above-described, and mixtures thereof. One preferred coated abrasive construction comprises a resin blend of the present invention, for example, urea-formaldehyde and phenolic resins, for a make coat and a resole base cured phenolic resin for a size coat.

Additionally, low aldehyde urea-aldehyde resins can be blended with minor amounts of one or more resinous adhesives, such as acid-cured phenolic resins and malamine resins, and then this mixture utilized in one or more of the coatings.

Nonwoven Abrasive Articles

Nonwoven abrasive articles are also within the scope of the invention. An open, lofty fibrous substrate is provided having a binder which binds fibers at points where they contact, the binder made from a binder precursor composition of the invention. Optionally, abrasive particles or non-abrasive particles (such as fillers) may be adhered to the fibers by the binder if the user desires. Nonwoven abrasives are described generally in U.S. Pat. Nos. 2,958,593 and 4,991,362, both incorporated by reference herein.

Methods of Making Abrasive Articles

One advantage of the process of making the abrasive articles of this invention over those previously known is the reduction in VOC emissions. The inclusion of urea-aldehyde resins, for example urea-formaldehyde, in the coatable binder precursor compositions described herein also significantly reduces formaldehyde emissions during curing of the binder precursor compositions, and may also increase water tolerance of the uncured binder precursor composition. Selection of a blend of an urea-aldehyde resin and a phenolic resin in accordance with the present invention will allow coatable viscosities to be obtained with water as a solvent. Organic solvents contributing to atmospheric VOC are then not required for viscosity adjustment.

In the manufacture of coated abrasive articles of the invention, the coatable binder precursor compositions, with curing, can be used as a treatment coating for the backing, e.g., paper or plastic sheeting, to provide a back coating (backsize coating) or front coating (presize coating) thereto, as a make coating to which abrasive grains are initially anchored, as a size coating for tenaciously holding abrasive grains to the backing, or for any combination of the aforementioned coatings. In addition, the coatable binder precursor compositions of this invention, when cured, can be used in coated abrasive article embodiments where only a single-coating binder is employed, i.e., where a single-coating takes the place of a make coating/size coating combination.

When employing polymeric film backings, the surface of the polymeric film to which the abrasive coating is to be applied can be primed to increase the adhesion of the abrasive coating to the film.

A method for manufacturing paper-backed coated abrasives can comprise providing a paper layer having a front and a back surface; providing a coatable slurry comprising abrasive particles and a binder precursor composition, the binder precursor composition comprising a blend of an urea-aldehyde resin and a phenolic resin, catalyzed by an acid catalyst, preferably a cocatalyst; coating the slurry onto the front surface of the paper layer to form a wet coated backing; and exposing the wet coated backing to an energy source sufficient to at least partially cure the binder precursor composition.

Preferred methods of this type include those wherein prior to coating the slurry onto the front surface of the paper layer, a latex barrier primer is coated onto the front surface of the paper layer. Any of the latices mentioned herein below may be used. Also, in some instances, a nonwoven fabric layer can be disposed between the paper layer and the abrasive coating. Preferably, this is made using a continuous process, wherein a roll of polyolefin film, nonwoven fabric, and paper are laminated together at temperatures sufficient to soften the polyolefin layer. Alternatively, a hot-melt adhesive may be applied to either the paper or the nonwoven fabric, with adhesion of the layers thereafter. A make coating precursor can then be applied to the backing, and abrasive particles embedded therein in known fashion, preferably electrostatically. A size coating precursor can then be applied over abrasive particles and make coating precursor, after which the entire structure can be subjected to curing conditions.

When the coatable binder precursor compositions described above are applied to a backing in one or more treatment steps to form a treatment coating, the treatment coating can be cured thermally by passing the treated backing over a heated drum; there is no need to festoon cure the backing in order to set the treatment coating or coatings. After the backing has been properly treated with a treatment coating, a make coating precursor can be applied. After the make coating precursor is applied, abrasive grains can be applied into and over the make coating precursor. The abrasive grains can be drop coated or electrostatically coated. Next, the make coating precursor, now bearing abrasive grains, can be exposed to a heat source which generally solidifies or sets the binder sufficiently to hold the abrasive grains to the backing. In some instances, the make coat precursor can be partially cured before the abrasive grains are embedded into the make coat as described in U.S. Pat. No. 5,368,618. Then, a size coating precursor can be applied. The make coat precursor and/or size coat precursor can be applied by any suitable method including roll coating, spraying, die coating, curtain coating, and the like. The temperature of the make coat precursor and/or size coat precursor can be room temperature or higher, preferably from 30° to 60° C., more preferably from 30° and 50° C. The size coating precursor/abrasive grain/(at least partially cured) make coating combination can be exposed to a heat source, for example, via a festoon or drum cure. This process will substantially cure or set the make and size coating precursor used in the coated abrasive constructions. Standard thermal cure conditions can be used to effect curing, for example, temperatures between 50° to 150° C., typically 75° to 120° C., preferably 80° to 115° C.

The coatable binder precursor compositions useful in the invention only need to be in at least one of the binder layers and does not need to be in every binder layer; the other binder layers can utilize various other binders known in the art, such as acid and base-cured phenolic resins, aminoplast resins, melamine resins, epoxy resins, polyurethane resins, isocyanurate resins, urea-formaldehyde resins, isocyanurate resins, radiation-curable resins (i.e., resins made using one or more unsaturated monomers) such as acrylated urethane resins, acrylated epoxy resins, and the like, resin emulsions as described herein, and mixtures thereof.

It is also contemplated that the coatable binder precursor compositions of the present invention can be employed, with curing, as a binder for open lofty nonwoven abrasive products of the type described in U.S. Pat. No. 2,958,593. Open, lofty nonwoven abrasive products typically include an open, porous, lofty, mat of fibers having abrasive grains bonded thereto by a binder. In one preferred embodiment, the resin blend of the present invention can be combined with abrasive grains to form a coatable, binder precursor slurry. The slurry can be coated onto at least a portion of the fibers of a lofty, open fibrous mat, and the resulting structure subjected to conditions sufficient to affect curing of the binder precursor composition.

Latex

It may be desirable to add from 1 to about 20 weight percent, more preferably from about 5 to 15 weight percent, of a latex (preferably an ethylene vinyl acetate (EVA) latex) to a binder precursor composition of an abrasive article of the present invention, particularly when polymeric film is used as the backing for a coated abrasives of the present invention. The latex can be added to any binder precursor composition of an abrasive article of the present invention including a binder precursor composition comprising a blend in accordance with the present invention.

Latex can function to improve the adhesion of urea-aldehyde binders to polymeric films, which tend to be very smooth. While not intending to be bound by any particular theory, it appears the latex functions to allow adhesion to the polymeric film.

A "compatible" binder precursor/resin emulsion mixture will preferably result in a clear film upon drying, although this is not required. It is believed that this compatibility may be attributed to the composition of the binder precursors used in the invention which do not contain organic solvent and have the above-described free aldehyde levels.

Useful acrylic latices include those which are 50–99 percent by weight solids water emulsions. Suitable latices include those known under the trade designation "Airflex 421" available from Air Products & Chemicals, Inc., which comprises vinyl acetate-ethylene copolymer. Further examples of latices (sometimes referred to as resin emulsions) that can be included in binder precursor compositions of the invention include those described above.

Test Methods

The following test methods were used to characterize the compositions and articles of the invention.

Dry Schiefer Test

This test provided a measure of the cut (material removed from a workpiece) of coated abrasive articles under dry conditions (about 22° C. and about 45% Relative Humidity).

A 10.16 cm diameter circular specimen was cut from the abrasive material tested and secured by a pressure-sensitive adhesive (3M Industrial Tape #442 double adhesive tape) to a back-up pad. The back-up pad was secured to the driven plate of a Schiefer Abrasion Tester (available from Frazier Precision Company, Gaithersburg, Md.). Doughnut shaped acrylic plastic workpieces, 10.16 cm outside diameter, 5.24 inside diameter, 1.27 cm thick, available under the trade designation "POLYCAST" acrylic plastic from Sielye Plastics, Bloomington, Minn., were employed as workpieces. The initial weight of each workpiece was recorded to the nearest milligram prior to mounting on the workpiece holder of the abrasion tester. A 4.54 kg weight was placed on the abrasion tester weight platform and the mounted abrasive specimen lowered onto the workpiece and the machine turned on. The machine was set to run for 500 cycles and then automatically stop. After each 500 cycles of the test, the workpiece was wiped free of debris and weighed. The cumulative cut for each 500-cycle test was the difference between the initial weight and the weight following each test.

Off-Hand Abrasion Test I

A steel substrate having a known paint film was abraded in each case with coated abrasives made in accordance with the invention which were attached to a random orbital sander (known under the trade designation "DAQ", from National Detroit, Inc.). The abrading pressure was about 0.2 kg/cm², while the sander operated at about 60 PSI@TOOL (413 kPa). The steel substrate having a paint film was purchased in each case from ACT Company of Hillsdale, Mich., and consisted of a steel substrate coated with 0.074 mm to 0.127 mm thick paint. The paint was a dupont base-coat clear-coat paint known under the trade designation "RK7103", coated by the ACT Company using General Motors paint specification number 998-4065. The cut in grams was computed in each case by weighing the paint-coated substrate before abrading and after abrading for a predetermined time, for example, 1, 2, or 3 minutes.

Curl Test Method

A 65 cm³ mold, as described in ASTM D2566 was used to mold the compositions tested. 25 g of a binder precursor composition (as described in each example below) was added to the mold. The mold, containing binder precursor, was then cured in a forced air oven.

For this experiment, two different cure conditions were chosen: 160° F. (71° C.) for 30 minutes and 240° F. (115° C.) for 30 minutes.

The molds were removed from the oven and the molded resin (bars) were removed from the mold and allowed to cool. The bar was measured after 4 hours, 1 day, and 2 days, respectively. The measurement was taken as a straight line from one end of the bar to the other as shown below. Since the length of the mold was 254 mm, a bar with no curl would have a measurement of 254 mm.

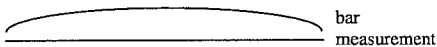

MATERIALS

The following materials were used as described in the examples (quotation marks indicate trade designations):

"AL3029R", from Borden Chemical, Columbus, Ohio, is an urea-formaldehyde resin at 65% solids, 325 cps (Brookfield viscometer, #3 spindle, 30 rpm, at 25° C., a free formaldehyde content of 0.1–0.5%, and a F/U of 1.4:1.0 to 1.6:1.0

"Tergitol 15-S-7"" is the trade designation for a nonionic surfactant available from Union Carbide, Danbury, Conn.

Grade P-80 aluminum oxide abrasive grains available under the trade designation "ALODUR BFRPL" from Treibacher, Treibach, Austria Two types of grade P-320 aluminum oxide abrasive grains having average particle size of 46 micrometers:

(1) a friable fused aluminum oxide available under the trade designation "ALODUR FRPL" from Treibacher, Treibach, Austria (2) a friable fused aluminum oxide blue available under the trade designation "ALODUR BFRPL" from Treibacher, Treibach, Austria "$AlCl_3$" is a 28 percent by weight aqueous solution of $AlCl_3.6H_2O$ in water, available from PVS Chemicals, Detroit, Mich.

"$NH_4Cl$" is ammonium chloride and was dissolved in water at about 25 weight percent "Airflex 421" is the trade designation for a vinyl acetate-ethylene copolymer latex, available from Air Products, Allentown, Pa.

"RPR-1" is a water dilutable resole phenolic resin with 75% solids

"VINAC 281" is the trade designation for a self-crosslinking vinyl acetate homoplymer latex with 52% solids, available from Air Products, Allentown, Pa.

"CMC" is the trade designation for a carboxymethylcellulose, available from Hercules Inc., Wilmington, Del.

"Methocel A15-LV" is the trade designation for methyl cellulose, available from Dow Chemical U.S.A., Midland, Mich.

"NB-60M" is the trade designation of an aqueous dispersion of zinc stearate, available from Witco Corp. Organics Division, New York, N.Y.

"Antifoam 1512" is the trade designation for an antifoam, available from Hercules Inc., Wilmington, Del.

"A" weight paper is a paper weighing between 80 to 110 g/m² with a latex barrier coating to allow topical application of a make coating resin 2 mil aziridine primed microvoided polyester film backing (67 g/m² available from Minnesota Mining and Manufacturing Company, St. Paul, Minn.).

EXAMPLES

The following non-limiting examples will further illustrate the present invention. All coating weights are specified in grams/square meter (g/m$^2$). All resin formulation ratios and percentages are based upon weight, and the weight ratio of formaldehyde to urea in the urea-formaldehyde resin used to make the coatable binder precursors ranged from about 1.4:1.0 to about 1.6:1.0 (standard urea-formaldehyde resin available from Borden Chemical, known under the trade designation "AL3029R").

TABLE 1

| Example | Size Resin |
|---|---|
| X | 97.4% AL3029R, 1.9% NH$_4$Cl, 0.7% AlCl$_3$ |
| Y | 97.4% RPR-1, 1.9% NH$_4$Cl, 0.7% AlCl$_3$ |
| 1 | 73.0% AL3029R, 24.3 RPR-1, 1.9% NH$_4$Cl, 0.7% AlCl$_3$ |
| 2 | 48.7% AL3029R, 48.7% RPR-1, 1.9% NH$_4$Cl, 0.7% AlCl$_3$ |

TABLE 2

3 MIN OFF-HAND ABRASION TEST I
INITIAL CURE = 10 MIN @ 70° C.

| | Cut (grams) Amount of Additional Postcure | | | |
|---|---|---|---|---|
| Example | None | +30 min @ 82° C. | +30 min @ 115° C. | +2 hours. @ 115° C. |
| X | 9.7 | 9.1 | 8.5 | 8.2 |
| Y | Not run | Not run | 8.3 | 9.8 |
| 1 | 9.2 | 9.0 | 9.2 | 8.9 |
| 2 | 8.1 | 9.3 | Not run | 10.0 |

Examples 1–2 and Comparative Example X and Y

Examples 1–2 and Comparative Examples X and Y utilized an A weight paper having a barrier coat onto which was applied a make coat consisting of: 87.8% AL3029R, 11.5% VINAC 281, 0.5% AlCl$_3$, and 0.15% Tergitol 15-S-7. The viscosity of this make resin was 1,000 cps and the wet make coating weight was 40 g/m$^2$. Grade P-80 aluminum oxide was electrostatically applied into the wet make resin at a weight of 155 g/m$^2$. After a make precure at 82° C. for 20 min., a size resin was applied over the precured make and mineral consisting of the resins in Table 1. The wet coating weight of the size resin was 147 g/m$^2$. The size resin used in each example is indicated in Table 1. The construction was then given an initial cure at 71° C. for 10 minutes. The samples which were postcured, as indicated in the tables below, were postcured before the addition of a supersize. After initial cure and any postcure, a supersize coating was applied consisting of: 42.0% NB-60M, 1.7% Methocel A15-LV, 0.7% CMC, 0.5% Antifoam 1512, and 55.1% water. The wet coating weight of the supersize resin was 100 g/m$^2$. The supersize coating was dried at room temperature.

Examples 1–2 and Comparative Examples X and Y were tested via Off-Hand Abrasion Test I using an abrading time of 3 minutes. The results of the Off-Hand land Abrasion Test I are summarized in Table 2. In Off-hand Abrasion Test I (this test removes paint down to metal), Examples 1–2 showed comparable or improved cut performance to Comparative Examples X and Y after the indicated postcures.

Examples 1–2 and Comparative Examples X and Y were tested via the Dry Shiefer Test and the results are shown in Table 3. Examples 1–2 showed superior cut to Comparative Examples X and Y after the indicated postcure.

The binder precursors of Examples 1–2 and Comparative Examples X and Y were tested according to the Curl Test Method and the results reported in Table 4. Example 1 achieved unexpectedly superior curl results as compared to Comparative Example X at each cure condition at each time interval.

TABLE 3

SCHIEFER TEST
INITIAL CURE = 10 MIN @ 70° C.

| Example | Cut (grams) Amount of Additional Cure: +40 min @ 115° C. |
|---|---|
| X | 3.7 |
| Y | 3.5 |
| 1 | 5.2 |
| 2 | 5.2 |

TABLE 4

CURL TEST (curl measured in mm)

| | Cure Conditions and Compositions | | | | | | | |
|---|---|---|---|---|---|---|---|---|
| | 160° F. (71° C.)/ 30 minutes | | | | 240° F. (115° C.)/ 30 minutes | | | |
| Time After Cure Cycle | 1 | 2 | X | Y | 1 | 2 | X | Y |
| 4 hours | 251 | * | 221 | * | 251 | # | 240 | * |
| 1 day | 244 | * | 198 | * | 254 | # | 241 | * |
| 2 days | 244 | * | 197 | * | 252 | # | 237 | * |

*liquid after cure condition; therefore not measured
not fully cured; too soft to test

Examples 3–5 and Comparative Examples AA, BB and CC

Examples 3–5 and Comparative Examples AA and BB utilized a 2 mil aziridine primed microvoided polyester film backing (67 g/m$^2$ available from Minnesota Mining and Manufacturing Company, St. Paul, Minn.). The make coat for Examples 3–4 and AA and BB consisted of: 74% AL3029R, 10.4% Airflex 421 latex, 9.0% Water, 6.0% NH$_4$Cl, 0.6% AlCl$_3$, and 0.2% Tergitol 15-S-7. The make coat of Example 5 consisted of: 72.1% AL3029R, 12.7%

RPR-1, 6.0% NH$_4$Cl, 0.6% AlCl$_3$, and 0.2% Tergitol 15-S-7. The viscosity of these make resins was 200 cps and the wet make coating weight was 10 g/m$^2$. A grade P-320 aluminum oxide was electrostatically applied into the wet make resin at a weight of 39 g/m$^2$; the particular grade P-320 aluminum oxide is indicated in Table 5.

After a make precure at 63° C. for 15 min., a size resin was applied over the precured make and mineral consisting of the formulations in Table 5. The wet coating weight of the size resin was 48 g/m$^2$. The construction was then given an initial precure at about 70° C. for 10 minutes. The samples which were postcured, as indicated in the tables below, were postcured before the addition of a supersize. Subsequently, a supersize coating was applied consisting of: 42.0% NB-60M, 1.7% Methocel A15-LV, 0.7% CMC, 0.5% Antifoam 1512, and 55.1% water. The wet coating weight of the supersize resin was 42 g/m$^2$. The supersize coating was dried at room temperature.

Comparative Example CC was a coated abrasive having a construction known under the trade designation "Grade P-320 255L STIKIT GOLD Film", available from Minnesota Mining and Manufacturing Company, St. Paul, Minn.

Examples 3–5 and Comparative Examples AA, BB and CC were tested via Off-Hand Abrasion Test I and the Dry Schiefer Test. The results of the off-hand abrasion tests are summarized in Table 6. In Off-hand Abrasion Test 1, Examples 3–5 generally showed a cut increase over Comparative Example AA, Comparative Example BB, or both, at longer and/or higher temperatures. In addition, Comparative Example CC achieved a cut of 8.2 in the Off-hand Abrasion Test I; thus, Examples 3–5 at a postcure for 40 additional minutes at 115° C. achieved comparable cut to Comparative Example CC, which requires a 4 hour cure at 115° C., in Off-hand Abrasion Test I.

postcure for 40 additional minutes at 115° C. achieved comparable cut to Comparative Example CC, which requires a 4 hour cure at 115° C., in the Schiefer test.

TABLE 7

SCHIEEFER TEST
INITIAL CURE = 10 MIN @ 70° C.

| | Cut (grams) Amount of Additional Cure | | |
|---|---|---|---|
| Example | None | +20 min @ 70° C. | +40 min @ 115° C. |
| AA | 1.5 | 1.4 | 0.6 |
| BB | 1.5 | 1.5 | 0.5 |
| 3 | 1.2 | 2.3 | 2.3 |
| 4 | 1.2 | 1.7 | 2.2 |
| 5 | 1.2 | 2.1 | 2.7 |

The binder precursors of Examples 3–5 and Comparative Examples AA and BB were tested according to the Curl Test Method and the results reported in Table 8. Examples 3–5 achieved curl identical to each other in each test as did Comparative Examples AA and BB, as reported below. Examples 3–5 achieved unexpectedly superior curl results as compared to Comparative Examples AA and BB for each cure condition at each time measurement.

TABLE 5

| Example | Grain Type | Size Resin |
|---|---|---|
| AA | "FRPL" | 84.8% AL3029R, 8.0% water, 4.4% NH$_4$Cl, 0.6% AlCl$_3$ |
| BB | "BFRPL" | 84.8% AL3029R, 8.0% water, 4.4% NH$_4$Cl, 0.6% AlCl$_3$ |
| 3 | "FRPL" | 63.6% AL3029R, 21.7% RPR-1, 4.4% NH$_4$Cl, 0.6% AlCl$_3$ |
| 4 | "BFRPL" | 63.6% AL3029R, 21.7% RPR-1, 4.4% NH$_4$Cl, 0.6% AlCl$_3$ |
| 5 | "BFRPL" | 63.6% AL3029R, 21.7% RPR-1, 4.4% NH$_4$Cl, 0.6% AlCl$_3$ |

TABLE 6

3 MIN OFF-HAND TEST
INITIAL CURE = 10 MIN @ 70° C.

| | Cut (grams) Amount of Additional Cure | | |
|---|---|---|---|
| Example | None | +20 min @ 70° C. | +40 min @ 115° C. |
| AA | 6.6 | 6.7 | 4.1 |
| BB | 7.3 | 7.7 | 2.6 |
| 3 | 4.0 | 7.5 | 8.4 |
| 4 | 4.9 | 7.9 | 9.3 |
| 5 | 4.9 | 8.4 | 9.8 |

The results shown in Table 7 demonstrate that Examples 3–5 achieve superior cut performance over Comparative Examples AA and BB at longer and/or higher temperature postcures. In addition, Comparative Example CC achieved a cut of 2.1 in the Schiefer Test; thus, Examples 3–5 at a

TABLE 8

CURL TEST (curl measured in mm)

| | Cure Conditions and Compositions | | | |
|---|---|---|---|---|
| | 160° F. (71° C.)/ 30 minutes | | 240° F. (115° C.)/ 30 minutes | |
| Time After Cure Cycle | 3, 4, and 5 | AA and BB | 3, 4, and 5 | AA and BB |
| 4 hours | 250 | 241 | 254 | 231 |
| 1 day | 235 | 230 | 254 | 227 |
| 2 days | 232 | 227 | 254 | 223 |

What is claimed is:

1. An abrasive article comprising (a) a plurality of abrasive particles and (b) a bond system which adheres the plurality of abrasive particles together, the bond system comprising a binder;

the binder being formed from a binder precursor essentially free of organic solvent, the binder precursor comprising a blend of an urea-aldehyde resin and a water dilutable resole phenolic resin, the blend being catalyzed by an acid catalyst.

2. A coated abrasive comprising (a) a backing having a major surface, (b) a plurality of abrasive particles, and (c) a bond system which adheres the plurality of abrasive particles to the major surface of the backing, the bond system comprising a binder;

the binder being formed from a binder precursor essentially free of organic solvent, the binder precursor comprising a blend of an urea-aldehyde resin and a water dilutable resole phenolic resin, the blend being catalyzed by an acid catalyst.

3. A nonwoven abrasive article having at least one major surface and an interior region, the nonwoven abrasive article comprising (a) an open lofty web of organic fibers, (b) a plurality of abrasive particles, and (c) a bond system which adheres the plurality of abrasive particles to the open lofty web, the bond system comprising a binder;

the binder being formed from a binder precursor essentially free of organic solvent, the binder precursor comprising a blend of an urea-aldehyde resin and a water dilutable resole phenolic resin, the blend being catalyzed by an acid catalyst.

4. A coated abrasive article in accordance with claim 2, wherein the acid catalyzed blend has a pH ranging from about 2.0 to about 5.0.

5. A coated abrasive article in accordance with claim 4, wherein the pH ranges from 3.5 to 4.5.

6. A coated abrasive article in accordance with claim 2, wherein the acid catalyst is a cocatalyst.

7. A coated abrasive article in accordance with claim 6, wherein the cocatalyst is a combination of $NH_4Cl$ and $AlCl_3$ in a wet weight ratio of about 9:1 to about 4:1.

8. A coated abrasive article in accordance with claim 7, wherein the wet weight ratio is 8:1 to 5:1.

9. A coated abrasive article in accordance with claim 2, wherein the phenolic resin is an alkaline condensed, reaction product of phenol and aldehyde.

10. A coated abrasive article in accordance with claim 9, wherein the phenolic resin has a molar ratio of aldehyde to phenol of greater than or equal to 1:1.

11. A coated abrasive article in accordance with claim 10, wherein the molar ratio ranges from 1:1 to 3:1.

12. A coated abrasive article in accordance with claim 2, wherein the binder precursor consists essentially of a blend of an urea-aldehyde resin and a water dilutable resole phenolic resin and water.

13. A coated abrasive article in accordance with claim 2, wherein the blend comprises from about 5 to about 90 weight percent of the water dilutable resole phenolic resin and from about 95 to about 10 weight percent of the urea-aldehyde resin.

14. A coated abrasive article in accordance with claim 2, wherein the blend comprises from 10 to 60 weight percent of the water dilutable resole phenolic resin and from 90 to 40 weight percent of the urea-aldehyde resin.

15. A coated abrasive article in accordance with claim 2, wherein the backing is selected from the group consisting of film and paper.

16. A coated abrasive article in accordance with claim 2, wherein the binder precursor further comprises one or more additives selected from the group consisting of fillers, fibers, lubricants, grinding aids, anti-static agents, wetting agents, surfactants, pigments, dyes, coupling agents, plasticizers, and suspending agents.

17. A coated abrasive article in accordance with claim 2, wherein the binder precursor further comprises a latex resin.

18. A coated abrasive article in accordance with claim 2, wherein the binder precursor comprises no more than about 10% by weight organic solvent.

19. A coated abrasive article in accordance with claim 2, wherein the binder precursor comprises no more than about 5% by weight organic solvent.

20. A coated abrasive article in accordance with claim 2, wherein the binder precursor comprises no more than about 2% by weight organic solvent.

21. A coated abrasive article in accordance with claim 2, wherein the binder precursor comprises no more than about 1% by weight organic solvent.

22. A coated abrasive article in accordance with claim 2, wherein the binder precursor comprises 0% by weight organic solvent.

23. A coated abrasive article in accordance with claim 2, further comprises a supersize coating.

24. A coated abrasive article in accordance with claim 23, wherein the supersize coating comprises a metal stearate.

25. A method of making a coated abrasive article comprising:

(a) providing a backing having at least one major surface, (b) applying a make coat precursor over the at least one major surface of the backing, (c) embedding a plurality of abrasive particles into and onto the make coat precursor, (d) at least partially curing the make coat precursor, (e) applying a size coat precursor, and (f) curing the size coat precursor;

wherein at least one of the make coat precursor and the size coat precursor comprises a binder precursor comprising a blend of an urea-aldehyde resin and a water dilutable resole phenolic resin, the blend being catalyzed by an acid catalyst, the binder precursor being essentially free of an organic solvent.

26. A method in accordance with claim 25 wherein the blend is prepared by adding the phenolic resin to the urea-aldehyde resin.

27. A method in accordance with claim 25 wherein the blend comprises from about 5 to about 90 weight percent of the water dilutable resole phenolic resin and from about 95 to about 10 weight percent of the urea-aldehyde resin.

28. A method in accordance with claim 25 wherein the blend comprises from 10 to 60 weight percent of the water dilutable resole phenolic resin and from to 40 weight percent of the urea-aldehyde resin.

29. A method in accordance with claim 25 wherein the blend has a percent solids ranging from about 40 to about 72%.

* * * * *